United States Patent [19]
Kass et al.

[11] Patent Number: 5,799,965
[45] Date of Patent: *Sep. 1, 1998

[54] HITCH HAVING SPRING BARS WITH INTEGRAL HANGER

[75] Inventors: John J. Kass; Richard McCoy, both of Granger, Ind.

[73] Assignee: Reese Products, Inc., Elkhart, Ind.

[*] Notice: The term of this patent shall not extend beyond the expiration date of Pat. No. 5,647,603.

[21] Appl. No.: 546,385

[22] Filed: Oct. 20, 1995

[51] Int. Cl.⁶ .................................................. B60D 1/42
[52] U.S. Cl. ................................. 280/406.1; 280/484
[58] Field of Search ........................... 280/406.1, 406.2, 280/405.1, 483, 484, 455.1

[56] References Cited

U.S. PATENT DOCUMENTS

| | | | |
|---|---|---|---|
| 3,194,584 | 7/1965 | Reese | 280/406.2 |
| 3,206,224 | 9/1965 | Bock et al. | 280/406.2 |
| 3,520,556 | 7/1970 | Warner | 280/406.2 |
| 3,542,395 | 11/1970 | Millikan | 280/406.2 |
| 3,552,771 | 1/1971 | Hendricks | 280/406.2 |
| 3,600,004 | 8/1971 | Newkirk | 280/406.2 X |
| 3,731,950 | 5/1973 | Burcham | 280/406.2 |
| 4,248,451 | 2/1981 | Usinger | 280/406.2 X |
| 4,679,812 | 7/1987 | Byrnes | 280/406.2 |
| 5,375,867 | 12/1994 | Kass et al. | 280/457 |
| 5,562,298 | 10/1996 | Kass et al. | 280/406.1 X |
| 5,628,525 | 5/1997 | Kass et al. | 280/406.2 |
| 5,647,603 | 7/1997 | Kass et al. | 280/406.1 |

*Primary Examiner*—Kevin Hurley
*Attorney, Agent, or Firm*—King and Schickli

[57] ABSTRACT

A weight distributing hitch includes a hitch bar for mounting to a vehicle, a ball mount head carried on the hitch bar, a hitch ball and a pair of spring bars. Each spring bar includes an integral lug for engaging a trailer and securing the spring bar in a position to more evenly distribute the weight of the trailer over the axles of the towing vehicle. Each lug also includes a integral retaining tab. Additionally, the weight distributing hitch includes a pair of friction assemblies that are mounted on the trailer. Each such assembly includes a friction pad that receives and supports the integral lug of one of the spring bars.

4 Claims, 2 Drawing Sheets

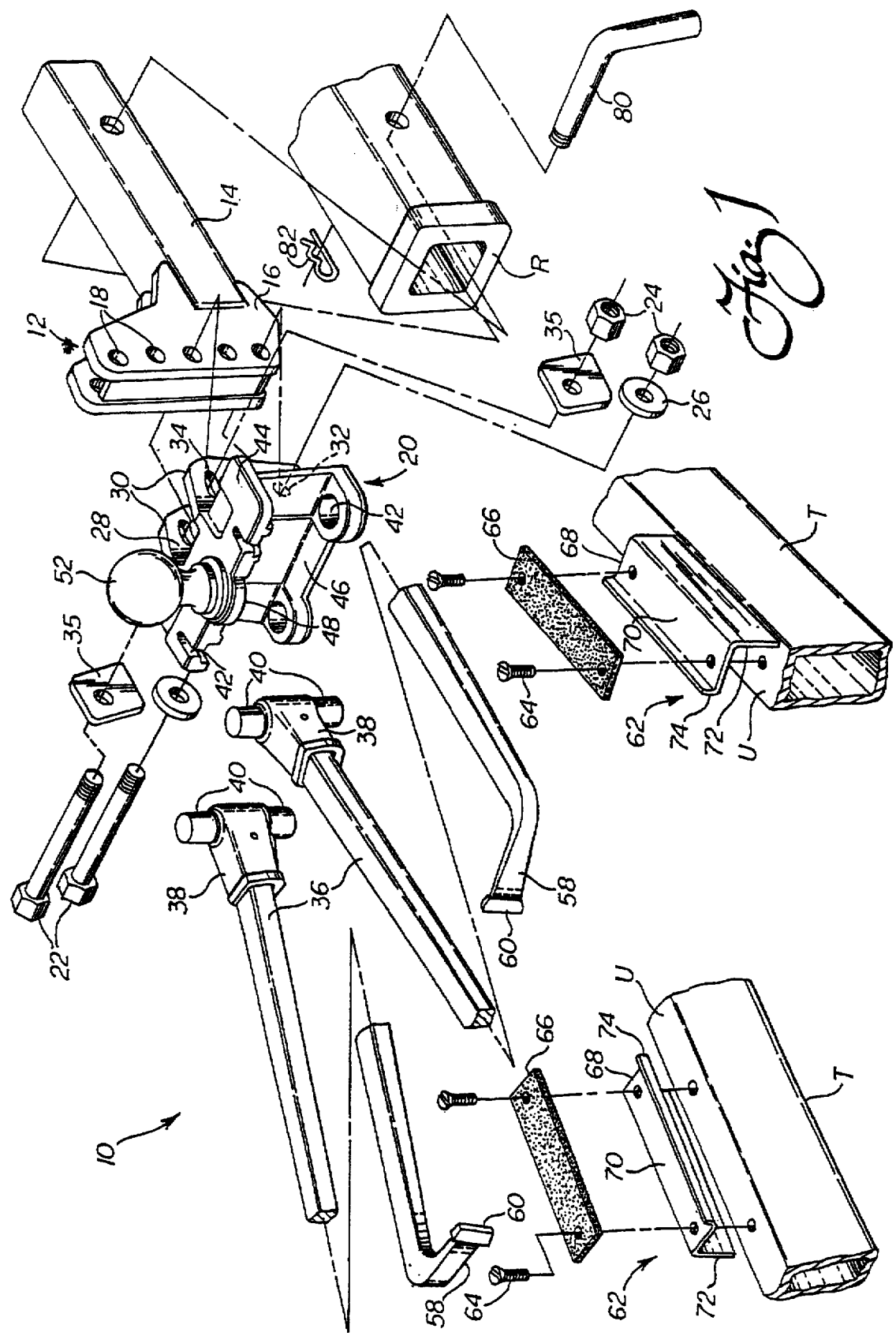

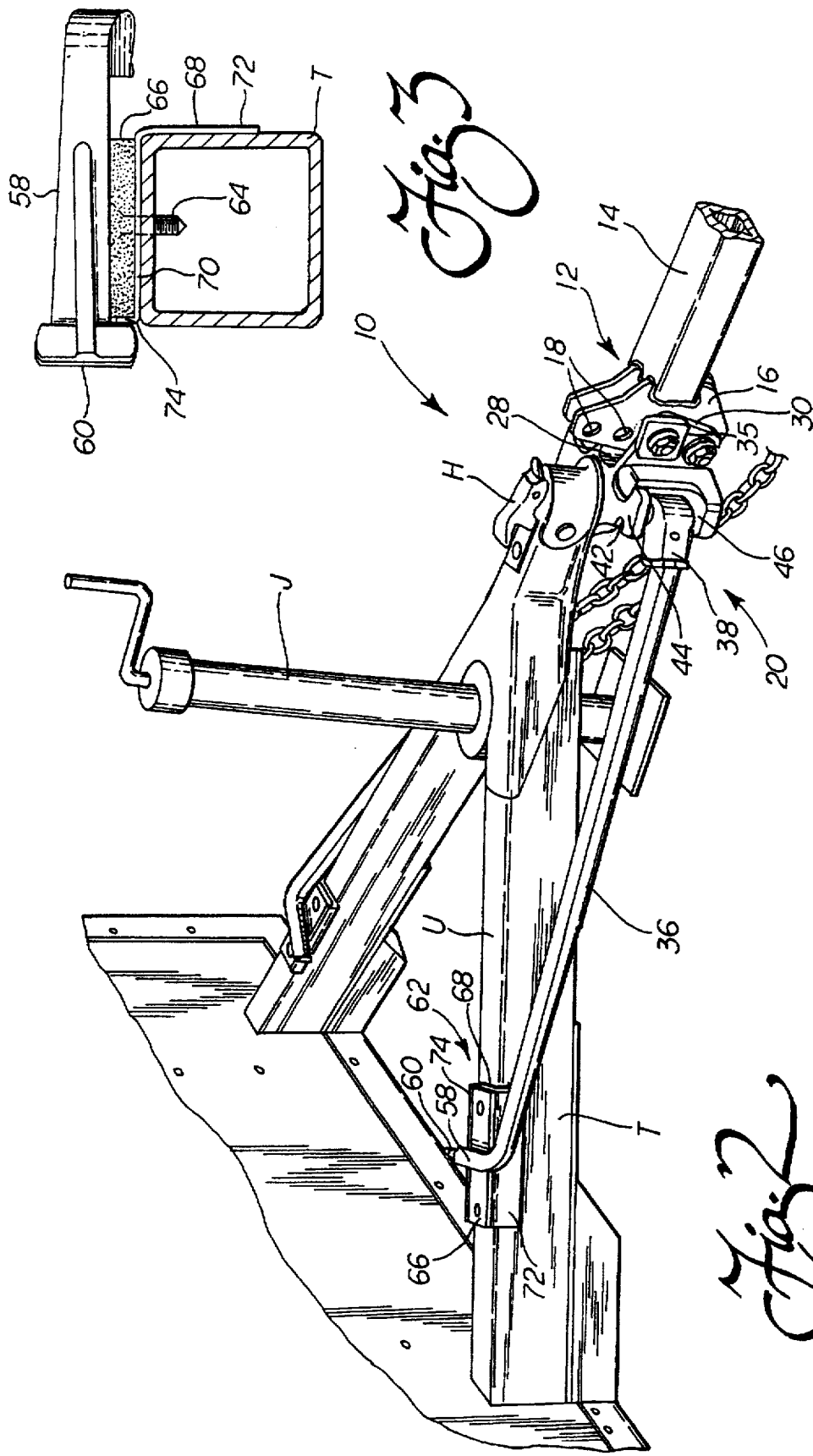

HITCH HAVING SPRING BARS WITH INTEGRAL HANGER

TECHNICAL FIELD

The present invention relates generally to the towing field and, more particularly, to a new and improved weight distributing hitch assembly incorporating spring bars with an integral lug for hanging the distal end of the spring bars directly onto a portion of the trailer frame.

BACKGROUND OF THE INVENTION

Hitch assemblies for more evenly distributing the tongue weight of a trailer over the front and rear axles of a towing vehicle are well known in the art. A particularly advanced design of weight distributing hitch assembly is disclosed in the assignee's issued U.S. Pat. No. 5,375,872 to Kass et al. entitled "Weight Distributing Hitch". This hitch assembly includes a hitch bar for receipt in a receiver mounted to the vehicle and a ball mount head for mounting on the hitch bar at a selected tilt angle. A pair of spring bars are mounted at their proximal end to the ball mount head. The distal ends of these spring bars are connected by means of cooperating lift units and chains to the frame of the trailer. Such state of the art lift units are exemplified by Reese Products, Inc. product number 21160 incorporating a body that is mounted to the trailer frame, a chain hook with pivoting locking lever and a safety pin for securing the chain hook and lever in an operative position. As is known in the art, the amount of leveling or load transfer to the front axle of the vehicle is adjusted by engaging different links of the chains with the chain hooks of the lift units.

While such an arrangement is effective for its intended purpose, the lift units must be properly mounted to the trailer frame and the proper chain links engaged in the chain hooks in order to provide proper operation and a desired distribution of weight. While relatively simple, these procedures require some time to complete and may frustrate and annoy certain impatient individuals. Accordingly, a need is identified for a weight distributing hitch assembly allowing even greater ease and convenience of installation and operation. This is particularly true with respect to the connection of the distal end of the spring bars to the trailer frame in order to provide the weight distributing action.

SUMMARY OF THE INVENTION

Accordingly, it is a primary object of the present invention to provide a weight distributing hitch assembly of improved design especially adapted for towing a trailer behind a vehicle.

Another object of the present invention is to provide a weight distributing hitch assembly having a light weight and compact configuration incorporating a unique spring bar structure that allows quick and convenient connection of the spring bars between the ball mount head and trailer frame.

Yet another object of the present invention is to provide a weight distributing hitch assembly incorporating a unique spring bar mounting system wherein the spring bars include integral lugs for hanging onto or over the trailer frame. Further, the trailer frame may include friction pads for supporting the lugs thereon that provide added resistance to sliding movement of the spring bars relative to the trailer frame and, therefore, a measure of trailer sway control.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved weight distributing hitch assembly is provided for towing a trailer behind a vehicle. The weight distributing hitch assembly includes a hitch bar of a type known in the art for mounting to the towing vehicle. More specifically, the hitch bar includes a mounting post that is received in the receiver box of a hitch receiver that is secured to the frame of the towing vehicle in a well known manner.

The weight distributing hitch assembly also includes a ball mount head mounted on the distal or head-receiving end of the hitch bar. Preferably, a hitch ball, also of a type well known in the art, is carried on the ball mount head. Such a hitch ball is adapted for receipt in a cooperating trailer coupler socket of the trailer to be towed behind the vehicle.

Additionally, in accordance with an important aspect of the present invention, a pair of spring bars are provided for distributing the trailer weight relative to the axles of the vehicle. Each of the pair of spring bars includes a proximal end that is mounted by mean of a trunnion arrangement to the ball mount head and a distal end having a lug for engaging the frame of the trailer and securing the spring bar in an operative, weight distributing position bridging between the ball mount head and trailer frame.

Preferably, each of the spring bars is substantially L-shaped and each of the lugs includes a retaining tab. The retaining tab not only functions to secure the lug of the associated spring bar in a position on or overlying the trailer frame, but also provides a readily visible indicator of the proper positioning of the spring bar to the vehicle operator. Preferably, the spring bars are hot formed from steel or other appropriate high strength material so that the spring bar, lug and retaining tab are all of integral, one piece construction.

In accordance with another aspect of the present invention, the weight distributing hitch assembly further includes a pair of friction pads. These friction pads are mounted to the trailer so as to overlie the frame at two points where each of the friction pads receives and supports a lug of one of the pair of spring bars. The friction pads may be fastened to the trailer frame by any appropriate means known in the art such as self-tapping screws. Preferably, the friction pads are formed from a durable, high friction material such as available from Friction Material Company under product designation NA104 which provides some frictional resistance to relative sliding movement of the spring bar lugs across the trailer frame. As a result, trailer sway is resisted and controlled and vehicle towing performance and driver comfort is increased.

Still more preferably, each friction pad is a part of an assembly including a relatively rigid mounting bracket that acts as a backing support when securing the friction pad to the trailer frame. Additionally, each mounting bracket includes a projecting friction pad edge flange. This edge flange engages the retaining tab when the spring bar lug is resting on the friction pad thereby functioning to guide the spring bar in sliding movement along the trailer frame while protecting the edge of the friction pad from damage.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is an exploded perspective view showing the weight distributing hitch assembly of the present invention;

FIG. 2 is a perspective view showing the weight distributing hitch assembly operatively connected to a trailer with the spring bars engaging the trailer frame and in position to provide weight distributing action; and FIG. 3 is a detailed partially sectional view showing a spring bar lapped over a friction pad secured on the trailer frame.

Reference will now be made in detail to the present preferred embodiment of the invention, an example of which is illustrated in the accompanying drawing.

DETAILED DESCRIPTION OF THE INVENTION

Reference is now made to FIG. 1 showing the weight distributing hitch assembly 10 of the present invention. As should be appreciated, the hitch assembly 10 includes a hitch bar 12 of a type known in the art including a tubular mounting post 14 for engagement in a receiver box R of a hitch receiver mounted to a vehicle (not shown). Such a hitch receiver is, for example, a Class II or III hitch receiver with two inch opening as manufactured by Reese Products, Inc. of Elkhart, Ind., the assignee of the present invention.

The distal end of the hitch bar 12 includes a split end mounting rack 16 having a series of aperture sets 18 allowing for height adjustment of the ball mount head 20. The ball mount head 20 may be a one-piece, integral construction cast from ductile iron. The ball mount head 20 is secured to the mounting rack 16 of the hitch bar 12 by means of two cooperating fasteners shown as bolts 22 and cooperating nuts 24. Lock washers 26 may be provided to insure the integrity of the connection.

More specifically, the ball mount head 20 includes a substantially U-shaped spring bar mounting bracket 28 and a pair of spaced, parallel mounting flanges 30 so as to form a yoke adapted to received the mounting rack 16. When properly mounted, the lower bolt 22 extends through the aligned cooperating apertures 32 (only one visible in FIG. 1) in the mounting flanges 30 and the one aligned aperture set 18 in the interdisposed mounting rack 16. Similarly, upper bolt 22 extends through an indexable, eccentric washer 35, the aligned cooperating arcuate slots 34 in the mounting flanges 30 and through a second aligned aperture set 18 in the interdisposed mounting rack 16. The arcuate slots 34 allow the ball mount head 20 to be pivoted relative to the hitch bar 12 about the lower bolt 22. Washers 26 are provided on the lower bolt 22 at each exposed side of the mounting flanges 30. Next, the bolts 22 and cooperating lock nuts 24 are then tightened. This arrangement allows the tilt angle of the ball mount head 20 to be selected by manipulation of the indexable, eccentric washer 35 in a manner described in detail in previously referenced U.S. Pat. No. 5,375,872 to Kass et al.

As further shown with reference to FIG. 1, the mounting bracket 28 includes an upper platform 44 having an aperture 48 for receiving the shank 50 of a hitch connector such as hitch ball 52. The hitch ball 52 is secured in place by welding or other means known in the art.

As also shown in FIG. 1, the weight distributing hitch assembly 10 includes a pair of spring bars 36. Each spring bar 36 includes a trunnion 38 at its proximal end for mounting in the ball mount head 20. More specifically, each mounting trunnion 38 includes a pair of oppositely disposed and outwardly projecting pivot pins 40. As is known in the art, the pivot pins 40 on the trunnion 38 are received in a first set of cooperating sockets 42 in the upper and lower legs or platforms 44, 46 of the ball mount head 20. A more detailed presentation of the trunnion connection of the spring bars 36 to the ball mount head 20 is presented in the assignee's co-pending U.S. patent application Ser. No. 08/319,908, filed on Oct. 7, 1994, entitled "Weight Distributing Hitch Assembly", the disclosure of which is fully incorporated herein by reference.

In accordance with an important aspect of the present invention, each spring bar 36 includes a lug 58 adjacent the distal end thereof that projects inwardly in a transverse direction. Thus, the lug 58 and main body of the spring bar 36 form a substantially L-shape. As will be described in greater detail below, the lugs 58 allow the distal end of the spring bars 36 to be secured to the frame of the trailer T (see also FIG. 2) in a straightforward and convenient manner. This provides ease of installation.

As further shown in FIGS. 1 and 3, each lug 58 includes an integrally depending retaining tab 60. The lug 58 and cooperating retaining tab 60 on each spring bar 36 are geometrically arranged so that each lug extends in a first plane and each retaining tab extends in a second plane substantially perpendicular to the first plane. As will be described in greater detail below, the retaining tab 60 allows one to visually confirm that an associated spring bar 36 has been properly connected to the frame of a trailer T to provide weight distributing action. Additionally, each retaining tab 60 functions to maintain the spring bar 36 associated therewith in proper position with the cooperating lug 58 overlying the upper surface U of the frame of the trailer T.

So as to resist and control trailer sway often experienced when traversing undulating pavement and/or sweeping curves at highway speeds and thereby improve overall ride quality/trailer hitch performance, the weight distributing hitch assembly 10 may also include a pair of friction pad assemblies 62. Each friction pad assembly 62 is mounted to the upper surface U of the frame of the trailer T directly behind the trailer coupler socket H. In this position, one friction pad assembly 62 receives and supports each spring bar 36. The mounting of the friction pad assemblies 62 may be by any means known in the art including, for example, an adhesive or a fastener such as self-tapping screws 64 shown in FIG. 1.

Preferably, each friction pad assembly 62 includes a friction pad 66 formed from a high friction material such as available from Friction Material Company under product designation NA104 and a supporting mounting bracket 68 preferably formed from a sheet metal such as steel. More specifically, the friction pad 66 is bonded to a first planar section 70 of the mounting bracket 68 so as to provide underlying support. Additionally, mounting bracket 68 includes a second planar section 72 that forms a substantially 90° included angle with the first planar section 70. Together, the sections 70, 72 define a mounting pocket for engaging the frame of the trailer T. Additionally, the mounting bracket 68 includes a projecting friction pad edge flange 74.

As described in greater detail below, the edge flange 74 serves several functions. The flange 74 protects the inwardly disposed edge of the friction pad 66 from being damaged by frictional engagement with the retaining tab 60 during towing. The flange 74 also engages the retaining tab 60 and functions as a guide when the associated spring bar 36 slides relative to the frame of the trailer T during towing. Thus, the spring bars 36 are maintained in position with the lugs 58 overlying the frame of the trailer T while resting upon the friction pads 66.

Advantageously, as should be appreciated from the above comments, the lugs 58 and retaining tabs 60 function as an integral spring bar hanger that allows direct connection of the distal ends of the spring bars 36 to the frame of the trailer T (see FIG. 2). In use, the height of the forward end of the trailer T including the coupler socket H is adjusted up or down using the tongue jack J until the trailer is level. When level, the distance from the ground to the top of the coupler socket H is also measured. Next, the hitch bar 12 is inserted into the receiver box R and secured in place utilizing a pull pin 80 and clip 82 in accordance with a procedure well known in the art. Next, the ball mount head 20 is installed on the mounting rack 16 at a selected height so that the hitch ball 52 is nearest to the height of the coupler socket H. With the vehicle and trailer in line, the hitch socket H is placed on the hitch ball 52. The coupler latch is then closed to secure the trailer to the towing vehicle through the hitch assembly 10.

Next the tongue jack J is raised about 2–3 inches or more. From this position an individual may grasp an intermediate portion of the spring bar 36 adjacent the distal end thereof and position the spring bar upwardly so that the lug 58 extends or projects over the top surface U of one of the frame rails of the trailer T. The friction pad assemblies 62 are then positioned on the upper surface U of the frame rails of the trailer T. More specifically, the friction pad assemblies are positioned so that the lug 58 of each spring bar 36 is centered on one friction pad 66. The necessary holes are then drilled in the frame rails and the friction pad assemblies 62 are secured in position by means of the self-tapping screws 64.

Next, the tongue jack J is lowered in order to check the coupler H height. If the top of the coupler socket H is more than ½ inch lower than the original measurement, the tongue jack J is raised, and the spring bars 36 are disconnected from the frame rails of the trailer T. The tongue jack J is then lowered and the eccentric washer 35 is adjusted to index the ball mount head 20 to a new tilt angle. The tongue jack J is then again raised to allow installation of the spring bars 36 with the lugs 58 overlying the frame rails of the trailer T. The tongue jack J is then again lowered to check the coupler socket H height. Once proper height is established the ball mount nuts 24 are torqued to 85 lbft.

Advantageously, by simply positioning the spring bars 36 to hang by means of the integral lugs 58 from the trailer frame rails, one is able to operatively position the spring bars to provide the desired weight distributing action. This is a simple operation that may be completed in one movement to the utmost convenience and satisfaction of the user. There is no need to select a proper chain link or secure a lift bracket with a safety clip as required by state of the art lift units commonly utilized in this field.

Of course, it should be appreciated that not only is the weight distributing hitch assembly 10 of the present invention easier to use, it is a simpler structure that is less expensive to produce. The prior art lift brackets with their latch mechanism and chain link connection are eliminated and replaced with a spring bars 36 having integral lugs 58 and the friction pads 66 that provide some added resistance to the sliding movement of the lugs 58 of the spring bars 36 relative to the frame of the trailer T as the trailer pivots about the hitch ball 52 during towing. As a result, any swaying motion imparted to the trailer during towing is resisted. Thus, the present hitch assembly 10 advantageously provides a measure of sway control previously unavailable in state of the art hitches equipped with lift unit and sway bar chain connectors. Consequently, the present invention represents a significant advance in design that achieves more than the prior art hitch designs. Further, this is accomplished by means of a simple structure that is less expensive to produce and more convenient and user friendly to utilize.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A weight distributing hitch assembly for towing a trailer behind a vehicle, comprising:

a hitch bar for mounting to the vehicle;

a ball mount head carried on said hitch bar;

a hitch connector carried on said ball mount head; and a pair of spring bars for distributing trailer weight relative to said vehicle, each of said pair of spring bars including a proximal end mounted to said ball mount head and a distal end having a lug for engaging said trailer and securing said spring bar in an operative, weight distributing position, each said lug including a retaining tab with said lug extending in a first plane and said retaining tab extending in a second plane substantially perpendicular to said first plane.

2. The weight distributing hitch set forth in claim 1, wherein each of said pair of spring bars is substantially L-shaped.

3. The weight distributing hitch set forth in claim 1, further including a pair of friction pads mounted on the trailer, each of said friction pads receiving a lug of one of said pair of spring bars.

4. The weight distributing hitch set forth in claim 3, including a fastener for fastening each of said pair of friction pads to the trailer.

* * * * *